United States Patent
Puttagunta et al.

(10) Patent No.: US 10,306,689 B2
(45) Date of Patent: May 28, 2019

(54) SYSTEMS AND METHODS FOR SHARED MIXED REALITY EXPERIENCES USING DIGITAL, PHYSICAL, TEMPORAL OR SPATIAL DISCOVERY SERVICES

(71) Applicant: Solfice Research, Inc., San Francisco, CA (US)

(72) Inventors: Shanmukha Sravan Puttagunta, Berkeley, CA (US); Fabien Chraim, Seattle, WA (US)

(*) Notice: Subject to any disclaimer, the term of this patent is extended or adjusted under 35 U.S.C. 154(b) by 19 days.

(21) Appl. No.: 15/893,247

(22) Filed: Feb. 9, 2018

(65) Prior Publication Data

US 2018/0227974 A1     Aug. 9, 2018

Related U.S. Application Data

(60) Provisional application No. 62/457,107, filed on Feb. 9, 2017.

(51) Int. Cl.
| | |
|---|---|
| G06F 15/16 | (2006.01) |
| H04W 76/14 | (2018.01) |
| G06T 11/60 | (2006.01) |
| H04W 8/00 | (2009.01) |
| H04L 29/08 | (2006.01) |
| H04W 48/08 | (2009.01) |
| H04W 4/46 | (2018.01) |

(52) U.S. Cl.
CPC .......... H04W 76/14 (2018.02); G06T 11/60 (2013.01); H04L 67/16 (2013.01); H04W 8/005 (2013.01); H04W 48/08 (2013.01); H04W 4/46 (2018.02)

(58) Field of Classification Search
CPC ..... H04L 67/12; H04L 2209/84; G07C 5/008; H04W 4/046; G06Q 30/0266
USPC .......................................................... 709/227
See application file for complete search history.

(56) References Cited

U.S. PATENT DOCUMENTS

| | | | |
|---|---|---|---|
| 2002/0095454 A1* | 7/2002 | Reed ................. | G06Q 30/0601 709/201 |
| 2003/0146854 A1* | 8/2003 | Jones .................... | G06Q 10/08 340/988 |
| 2006/0238383 A1* | 10/2006 | Kimchi ............. | G06F 17/30241 340/995.1 |
| 2008/0150786 A1* | 6/2008 | Breed ................. | B60N 2/2863 342/53 |

(Continued)

*Primary Examiner* — Phuoc H Nguyen
(74) *Attorney, Agent, or Firm* — Brad Bertoglio

(57) ABSTRACT

Systems and methods allow for devices, such as sensory systems and mixed reality content consuming systems installed within a vehicle, to discover each other, share multidimensional realities, inherit context for mixed reality content, and/or coordinate whilst providing a mixed reality user experience. A discovery service can receive information from multiple devices and correlate digital and physical characteristics thereof to enable devices to discover each other. Characteristics of a device that may be used for pairing may include its orientation physically, the observable reality of a device, the state-machine of the device, the intentions of the device whilst operating autonomously or with external assistance, the location of a device, the temporal/spatial information describing the device's movement over time in a multi-dimensional reality or any unique identifiers contained within or generated by the device.

6 Claims, 8 Drawing Sheets

(56) References Cited

U.S. PATENT DOCUMENTS

| | | | |
|---|---|---|---|
| 2010/0286899 A1* | 11/2010 | Jain | G08G 1/0104 |
| | | | 701/119 |
| 2013/0282357 A1* | 10/2013 | Rubin | G08G 9/02 |
| | | | 703/22 |
| 2016/0086391 A1* | 3/2016 | Ricci | G07C 5/008 |
| | | | 701/29.3 |
| 2017/0032402 A1* | 2/2017 | Patsiokas | G06Q 30/0266 |
| 2017/0270490 A1* | 9/2017 | Penilla | G06Q 10/20 |
| 2018/0047288 A1* | 2/2018 | Cordell | G08G 1/096888 |

\* cited by examiner

SYSTEMS AND METHODS FOR SHARED MIXED REALITY EXPERIENCES USING DIGITAL, PHYSICAL, TEMPORAL OR SPATIAL DISCOVERY SERVICES

TECHNICAL FIELD

The present disclosure relates in general to network-connected electronic devices, and in particular to discovery services for such devices.

BACKGROUND

Discovery services are deployed in software systems to reveal the presence of functionality or application services in a network. These discovery services are often used by software processes to discover available functionality from other devices within local networks.

Mixed reality systems integrate sensory experiences of both real and virtual worlds or spaces. Mixed reality systems are often associated with visual platforms overlaying virtual or electronic content on a real-world visual display. In some applications, it may be important for mixed-reality devices to be provided with reliable, flexible discovery capabilities to identify and communicate with other devices nearby.

SUMMARY

A method and apparatus is provided by which devices offering and/or seeking mixed reality content, such as sensors and systems in a vehicle capable of autonomous operation or having driver enhancement functionality, may discover and interact with other devices and/or services implemented on centralized network-connected server, to share content and implement improved mixed reality experiences.

In some embodiments, a network-connected server may facilitate sharing of mixed reality services amongst a plurality of vehicles, each vehicle containing one or more mixed reality service offering devices and/or one or more mixed reality service seeking devices, communicating via a common digital communications network. An associated method includes receiving, via the digital communications network, one or more announcements from each of one or more service offering devices. The announcements may include identification of services provided by the service offering device, and a location associated with the service offering device. The server may also receive a request for services for a service seeking device. The server then operates to publish, to the service seeking device, identification of one or more service offering devices (such as, e.g., a network address at which the service offering device may be contacted) and specification of services provided thereby, such that the service seeking device may pair with, and receive mixed reality services from, one or more of the service offering devices. Paired devices may communicate via the same data communications network used for discovery communications with the server (e.g. a wide area network), or via a second communications network accessible to both the service offering and service seeking devices (such as a local area network).

Such service offering devices and service seeking devices may be distributed across one or more vehicles in which they may be installed. Service offering devices may be grouped based on one or more features, such as sensor capabilities, intended route of travel, and/or time frame associated with an intended route of travel. Content may be shared between devices via various techniques, including data streaming and transmission via proxy server.

In some embodiments, spatial and/or temporal transforms may be applied to shared mixed reality content in order to, e.g., compensate for changes in translation, rotation and/or timing between a service offering device sharing such content, and service seeking device consuming the content, and/or a standardized common reference frame such as may be utilized by a centralized data aggregation server. Such transforms may be applied locally on a service offering device, locally on a service seeking device, and/or remotely via a discovery server or data aggregation server.

A server receiving shared mixed reality content may implement a pattern analysis module to one or more mixed reality content data streams to recognize one or more patterns within the data streams, and correlate those patterns with unique identifiers obtained from the service offering devices. The pattern analysis module output may be published via an API to, e.g., make aggregated mixed reality content available to external computing applications, whether implemented in-vehicle or remotely.

A network-connected mixed reality aggregation server may receive mixed reality content from one or more service offering devices, and generate aggregate mixed reality content. For example, the reality aggregation server may compare mixed reality content received from multiple devices to exclude outlier observations and establish a baseline truth. In generating the aggregate mixed reality content, content from each service offering device may be weighted based on, e.g., a sensor capability specification and/or other level of trust associated with the service offering device from which the content was received. The aggregate mixed reality content may then be shared with service seeking devices and/or other network-connected systems.

In some embodiments, an aggregate mixed reality server may operate to improve a confidence level in the aggregate mixed reality content by transmitting requests for observations to service offering devices capable of making the requested observations. Optionally, a service offering device having received a task may dynamically configure onboard sensory systems to optimize performance of the task, and/or filter collected mixed reality data to reduce data non-responsive to the task prior to returning the data via the communications network. In any case, responses to such requests may then be utilized to update and/or optimize the aggregate mixed reality content, such as by generating a shared mixed reality model. These and other types of requests may be queued as tasks, each of which may be dispatched to one or more qualified service offering devices. Service offering devices may be qualified for a task by a number of factors including, without limitation, one or more of device sensor capabilities and device location.

These and other aspects of the systems and methods described herein will become apparent in light of the further description provided herein.

DETAILED DESCRIPTION OF THE DRAWINGS

Figure 1:
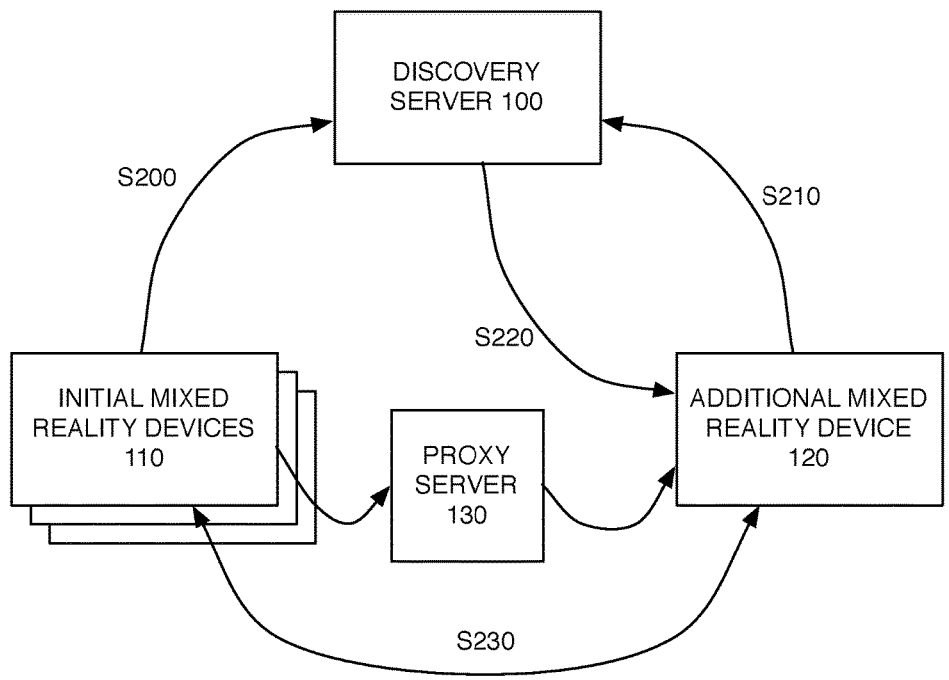
FIG. 1 is schematic block diagram of a framework for shared mixed reality services amongst networked devices.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

Some embodiments described herein provide a discovery framework that may be used by network connected devices to announce and discover the availability of mixed reality content. A discovery framework typically involves an initial networked device receiving or transferring media or other content onto other additional networked devices that may be introduced. Such concepts may be applied as described herein to provide a mixed reality environment that may be shared by multiple participants in a variety of operational contexts. One such context in which mixed reality services may be particularly valuable is with regard to vehicles having autonomous driving, semi-autonomous operation and/or driver assistance features utilizing mixed-reality content. In such embodiments, a vehicle may interact with other vehicles traversing a given geographic space, in order to better perceive objects within, and characteristics of, the space. For example, a first vehicle traversing a geographic space may discover and interact with other nearby vehicles to be notified of the presence of a particular road condition that is located outside the field of perception of the first vehicle, but within the field of perception for the second vehicle.

Figure 2:
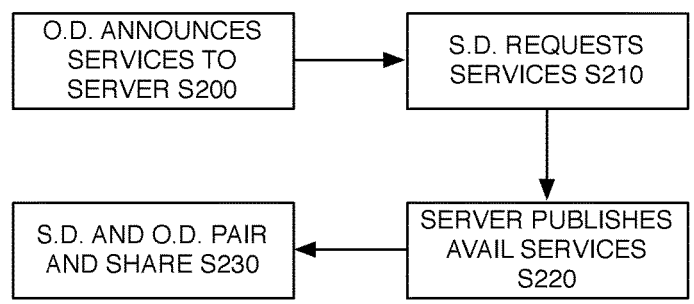
FIG. 2 is a process for device discovery in a framework for shared mixed reality services.

FIGS. 1 and 2 illustrate an exemplary embodiment of a mixed reality discovery framework. The mixed reality discovery framework includes discovery service backend server 100. Discovery service backend server 100 may be implemented via a network-connected compute server configured to operate as described further herein. In particular, server 100 may include one or more microprocessors and digital memory storing instructions which, when executed by the microprocessors, cause the server to perform certain operations described herein. Similarly, other network-connected devices described herein may likewise be implemented via systems including microprocessors and digital memory storing instructions which, when executive by the microprocessors, cause the systems to perform (directly or via interaction with other components) certain operations described herein.

One or more initial mixed reality devices 110 may be in communication with server 100, and present at various locations within a geographic space. Initial mixed reality devices 110 may each offer one or more mixed reality services to other devices, and are aware of one another's presence on the network and within geographic space. While initial mixed reality devices 110 are illustrated as a plurality of devices in FIG. 1, it is contemplated and understood that in some contexts, a single initial mixed reality device 110 may be present within a particular geographic space.

Additional mixed reality device 120 is also present within the geographic space, and is seeking to discover other devices 110 and receive mixed reality services from them. Initial devices 110 and additional device 120 are all in communication with discovery service back end server 100 via a data communications network, such as the Internet or a private wide area network. In some embodiments, after devices 110 and 120 have been paired, they may communicate with one another directly. In other embodiments, a proxy server 130 may be provided to facilitate certain communications between them, as described further hereinbelow. In yet other embodiments, a service offering device 110 and a service seeking device 120 may be implemented within a common item of equipment (e.g. multiple systems within a vehicle) or even within a single computing device (e.g. separate software-implemented modules executed by a common microprocessor, potentially interacting with one another via a loop back interface).

Figure 3:
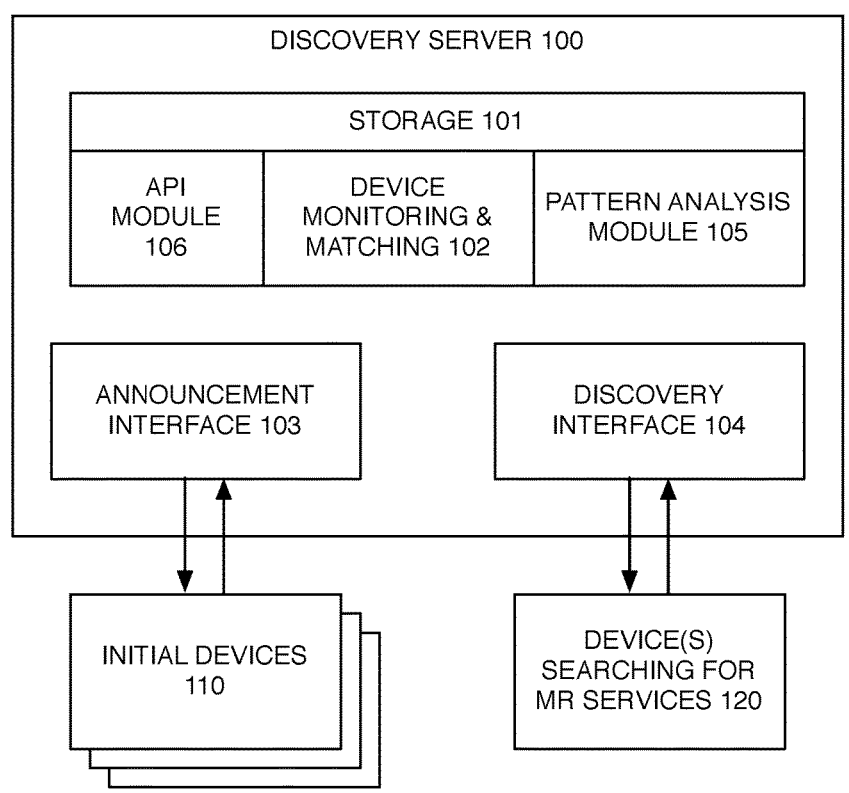
FIG. 3 is a schematic block diagram of a discovery service backend.

FIG. 3 is a schematic block diagram of discovery server 100, in accordance with one embodiment. Discovery server 100 includes announcement interface 103 for network communications with service offering devices 110. Discovery interface 104 enables communication with service seeking devices 120. Communications via interfaces 103 and 104 may be conveyed to and from device monitoring and matching module 102, operating as described further below. Discovery server 100 may also implement a pattern analysis module 105, described further hereinbelow. Data storage component 101 enables storage and retrieval of varying types of data, which may include one or more databases as well as various other structured and unstructured data storage mechanisms, also described further below. API module 106 may implement an Application Programming Interface enabling various other integrations with third party services, some of which are described elsewhere herein.

Devices 110 and 120 may each be a networked device comprising a computational device utilizing known networking protocols and networking interfaces. The networking protocols may include, but are not limited to, UDP, TCP, HTTP, Sockets, WebSockets, asynchronous event driven messaging or other networking protocols. The networking interfaces may include, but are not limited to, USB, Ethernet, CAN bus, Fiber Optics, WiFi or other networking interfaces.

Figure 4:
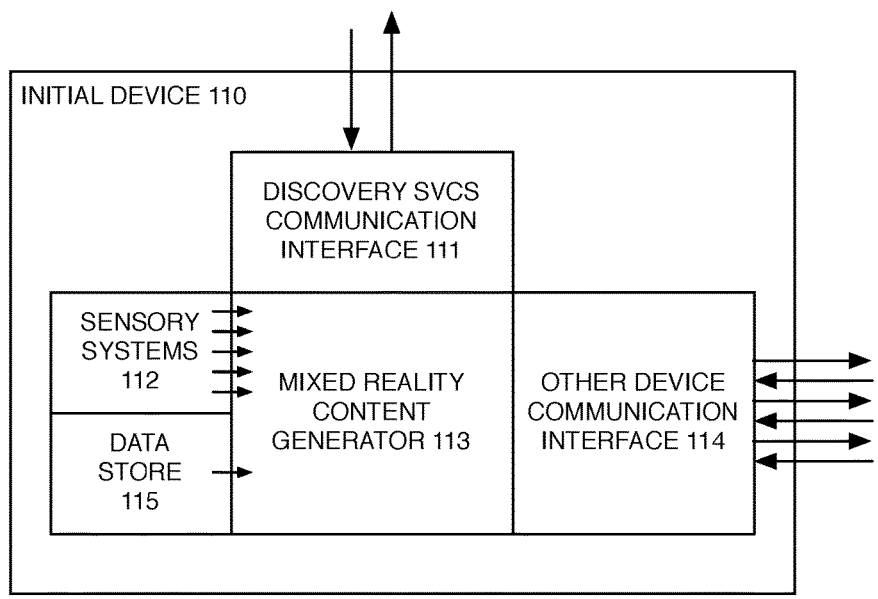
FIG. 4 is a schematic block diagram of an initial networked device configured for service offering.
Figure 5:
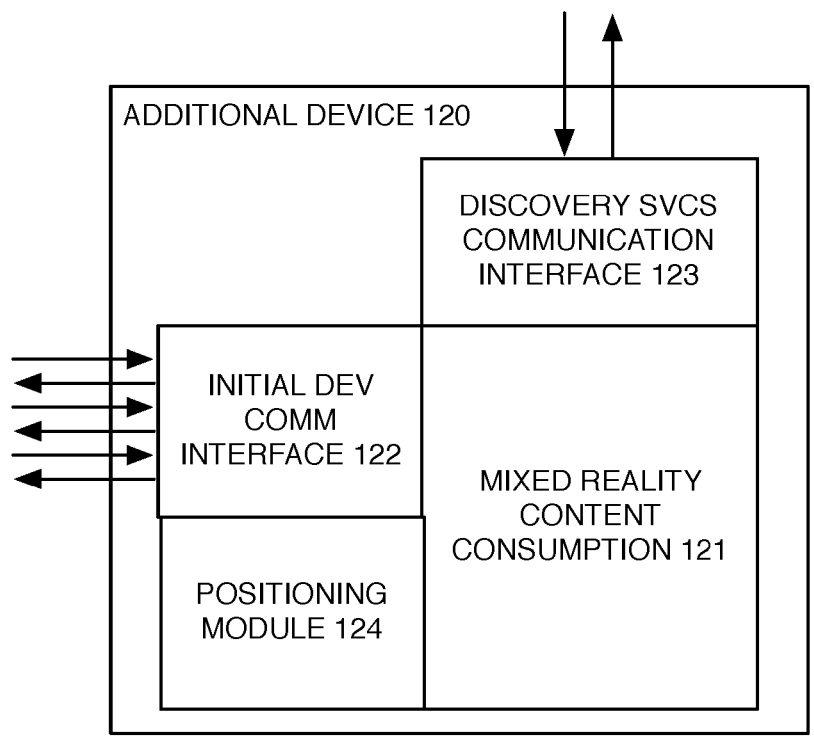
FIG. 5 is a schematic block diagram of an additional device configured for service seeking.

FIG. 4 is a schematic block diagram of an exemplary embodiment of an initial device 110. In the embodiments of FIGS. 4 and 5, devices 110 are illustrated as initial devices (i.e. devices previously actively registered with discovery server 100), as well as service offering devices (i.e. devices offering mixed reality content to other devices). Device 120 is illustrated as an additional device (i.e. a device seeking to register with discovery server 100, such as to be paired with other devices), and also a service seeking device (i.e. a device seeking to obtain mixed reality content shared by another device). However, it is contemplated and understand that in other embodiments, initial devices may include either or both of service offering devices and service seeking devices. Similarly, additional devices seeking registration with server 100 may be either service offering devices or service seeking devices. In yet other embodiments, a particular device may be both service seeking and service offering; such a device may include components of both FIG. 4 and FIG. 5. Service offering devices may also sometimes be referred to as serving devices or mixed reality content serving devices. Similarly, service seeking devices may also sometimes be referred to as a client devices and/or mixed reality content consuming devices.

Referring to FIG. 4, initial devices 110 may include a microprocessor-implemented mixed reality content generator 113 that generates mixed reality content for local use and potentially for sharing with other devices. Content generator 113 receives data from sensory systems 112. For example, in an exemplary autonomous vehicle embodiment, sensory systems 112 may include an inertial measurement unit. The information being relayed from the inertial measurement unit to mixed reality content generator 113 may include data from one or more of an accelerometer, a magnetometer, a gyroscope, a barometer, and a GPS receiver. Sensory systems 112 may also include some combination of optical, radio and/or laser-based sensors providing spatial data describing a physical environment proximate device 110, to mixed reality content generator 113. Such optical sensors may include an optical and/or infrared camera. Radio sensors may include a radar or ground penetrating radar. Laser-based sensors may include LiDAR sensors. These and other sensors 112 may provide data that is utilized by content generator 113 to generate mixed reality content for use locally by device 110, and for sharing with other devices 110.

The devices 110 may also include a data store 115, such as a cached data structure or queryable database. For example, in an exemplary autonomous vehicle embodiment, data store 115 may include a semantic map containing, inter alia, location data for known assets located in a geographic environment through which the vehicle is traversing. Data store 115 may provide data to systems including content generator 113. Amongst other uses, information within data store 115 may be queried by a positioning module within sensory systems 112 to determine the position and pose of a networked device relative to other objects, which vehicle position and pose may be provided to mixed reality content generator 113 for purposes of geolocation of mixed reality content. Of course, other positioning techniques and mechanisms (e.g. GPS, IMU) may be used in combination with, or in lieu of, the above described positioning system, in order to provide position and/or pose data to mixed reality content generator 113.

Each initial device 110 further includes a discovery services communication interface 111 and additional device communication interface 114. Discovery services communication interface 111 is a network communications interface that facilitates digital communication between device 110 and discovery service back end 100. Additional device communication interface 114 is a network communications interface that facilitates communication between device 110 and other devices to or from which mixed reality content may be shared, such as other devices 110 or a new device 120.

FIG. 5 is a schematic block diagram of an additional device 120, seeking to discover devices 110 and interact with them to receive and/or provide mixed reality content. New device 120 may sometimes be referred to herein as a service seeking device, to the extent that it seeks to discovery and utilize services provided by other devices 110; however, it is contemplated and understand that device 120 (and any other device) may, in some embodiments, act as both a service seeking device and a service offering device. In the context of its role as a service seeking device, new device 120 includes a mixed reality content consumption component 121, for which device 120 seeks to receive mixed reality content. In an exemplary autonomous vehicle application, mixed reality content consumption component 121 may be, e.g., a local environment mapping and/or navigational control module seeking information concerning conditions not directly perceivable by device 120 (such as traffic conditions ahead, beyond the range of perception for sensors installed locally on device 120 (not shown). Mixed reality content consumption component 121 will typically be implemented using a microprocessor accessing digital memory in order to utilize mixed reality content provided locally and from other sources. Similar to device 110, device 120 also includes communications interfaces for communicating with other devices in the mixed reality discovery framework, including device communications interface 122 for engaging in network communications with other devices 110, as well as discovery services back end communication interface 123 for engaging in communications with discovery service back end 100. Device 120 may contain a variety of sensory systems, analogous to sensory systems 112 in device 110; however, preferably, device 120 will minimally include a positioning module 124 in order to provide data regarding the position and pose of device 120 to other systems, including mixed reality content consumption component 121.

In some embodiments, a vehicle may include a single device that is offering or seeking mixed-reality content. In other embodiments, each vehicle may include multiple devices offering and/or seeking mixed reality content. In some embodiments, multiple devices on a given vehicle may interact with one another via onboard communication interfaces to collaboratively present a mixed reality service for sharing with other vehicles having service seeking devices. In other embodiments, multiple devices on a given vehicle may interact independently with discovery server 100 and service seeking devices (whether located within another vehicle or the same vehicle).

Referring back to FIG. 2, a process is provided that may be utilized by the devices of FIG. 1 in order to implement mixed reality service discovery. In step S200, service-offering devices 110 engage in networked communications with discovery service backend 100 to announce, e.g., their geographic location and services available to provide to other devices. In step S210, service seeking device 120, seeking mixed reality services from others, sends a service request to discovery service backend 100. The service request of step S210 may include the geographic location of device 120 (e.g. position and/or pose as determined by positioning module 124), and optionally a specification of services sought. In step S220, backend 100 responds to the query of step S210 by publishing available services to device 120. The publication of step S220 may include, inter alia, a network address at which one or more of service offering devices 110 may be reached for communications, and identification of one or more services available from devices 110.

The publication of step S220 may include publication of information relating to a subset of service offering devices 110. The subset may be determined by discovery service backend 100 using criteria based on one or more digital or physical characteristics. For example, in some embodiments, discovery service backend 100 may implement an algorithm to group spatial data streams together based on analyzing the movement of networked devices through multi-dimensional realities. Discovery service backend 100 may then introduce networked devices to each other based on the grouping of devices. Thus, for example, spatial metadata such as the location of each service offering device 110 (in absolute terms and/or relative to the location of service seeking device 120) may be used by discovery service backend 100 to select a subset of devices 110 to offer pairing with device 120.

In some embodiments, a discovery framework involves networked devices 110 and 120 reporting their location and a timestamp to discovery service backend server 100. Server 100 implements an algorithm to group spatial and temporal data streams together based on analyzing the movement of networked devices 110 and 120 through temporal and spatial multi-dimensional realities. Server 100 may then introduce networked devices 110 and 120 to each other based on the grouping of devices.

In some embodiments, a discovery framework may include a collection of grouping and matching algorithms relying on multi-dimensional features from a multitude of sensor streams from initial and additional networked devices. The algorithms utilize the input sensor data and additional device metadata to extract features in order to appropriately group the devices with matching characteristics.

Figure 6:
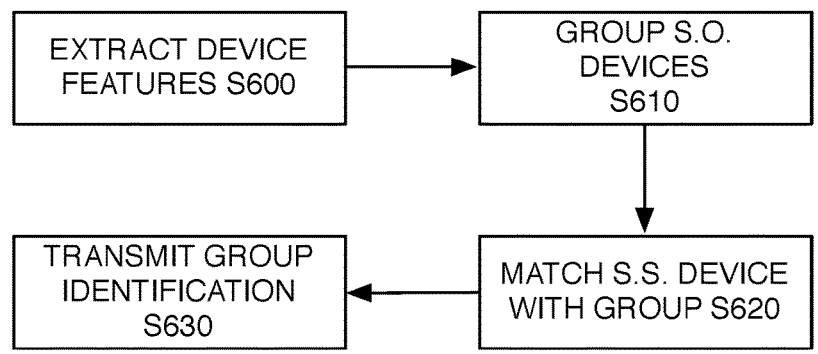
FIG. 6 is a process for grouping service offering devices.

FIG. 6 illustrates a process that may be utilized by server 100 to match a service seeking device with a group of service offering devices, such as may be performed in step S220 of FIG. 2. In step S600, one or more device features are extracted (e.g. from sensor streams or other data reported to server 100 by devices 110). In step S610, server 100 groups devices 110 based on the extracted features. In step S620, a service seeking device is matched with one or more of the groups of service offering devices using pairing metadata that may include, without limitation, one or more of the extracted features, geolocation or other spatial metadata, temporal metadata, device preferences, and equipment capabilities descriptors (e.g. sensor or other equipment specifications). In step S630, server 100 transmits identification (e.g. a network address and services description) of group members selected in step S620, to service seeking device 120.

For example, for embodiments in which the devices are vehicles, grouping and matching operations may be implemented to group vehicles carrying the same sensor hardware or having similar capabilities (e.g. all LIDAR-carrying vehicles, or all vehicles equipped with a high-frames-per-second stereo camera system). In other applications, such vehicles may be grouped based on what they are observing (e.g. vehicles with devices observing all the road signs on a common route of travel, e.g. along a common stretch of roadway, may be grouped to reliably detect signs in an area not having high-quality prior map data available).

These and other grouping or selection mechanisms may be used to achieve a desired system behavior. In an exemplary embodiment, the discovery framework may group together a platoon of vehicles traveling along the same stretch of roadway within a particular time frame, where each vehicle is carrying an initial device and multiple additional devices. The platoon of vehicles may include vehicles carrying an initial device (e.g. a device comprised of vision sensors, inertial sensors, 4G communication and a computer) and one additional device displaying road conditions by using data from the initial device. The grouping would then be used to share the observed reality in each vehicle and merge them into one common reality for all.

Finally, in step S230, device 120 may communicate with one or more of devices 110 to pair and share mixed reality content or services. Networked devices 110 and 120 may implement a direct network communication interface to establish a handshake to communicate directly between themselves. Another network communication interface may be provided to enable networked devices 110 and 120 to communicate via proxy or utilizing remote procedure calls or long polling, as may be known in the art of digital network communications.

In some embodiments, an initial communication protocol may be used prior to pairing of devices, and a different communication protocol may be used after pairing devices. For example, two devices in physical proximity to one another may initially rely on communications over a wide area network (e.g. cellular Internet service), even for direct communications, prior to pairing; after pairing, the same device may communicate via a second communications protocol such as Bluetooth, DSRC, NFC or another short range protocol. Such embodiments may be beneficial in reducing traffic over wide area networks, and/or enabling devices to shift between various communication protocols that are each optimized to the nature of the services shared.

Some embodiments may implement a protocol for authentication between initial networked devices and additional networked devices to establish a secure channel of communication. The channel may utilize encryption, decryption, encoding, decoding, compression, decompression, hashing and various other techniques to secure one-directional, bi-directional, unicast or multicast communication, and result in a more efficient communication. Encryption and decryption to secure communication channels may implement various techniques, such as symmetric, public-key, message verification, or other forms of encryption/cryptography. An inter-device communication protocol may include asynchronous, synchronous, remote procedure calls (RPC), peer to peer communication styles to enable an initial networked device to communicate with additional networked devices that is able to negotiate and pick from an array of available communication styles based on the constraints in the network stack. Some examples of constraints in the network stack may include firewalls, proxies, tunneling, bandwidth constraints.

Once a service seeking device is paired with a service offering device in step S230, the service seeking device may subscribe to notifications from other networked devices. Various messaging techniques may be utilized to deliver notifications from one device to another. The messaging techniques may include but are not limited to the usage of event triggers, long polling, stochastic processes or random intervals, Markov probability distribution functions associated with the environment, the field of view of the device and configurations.

Initial networked devices or additional networked devices may send information addressed to a single recipient or multiple recipients utilizing various addressing such as IPv4, IPv6, Private IP addresses, IP Subnetworks, Hostnames, or other methods such as unicast addressing, broadcast addressing, multicast addressing, any cast addressing, or a network address translator.

A discovery framework may include a shared multi-dimensional reality allowing multiple devices to coordinate, share intentions, and react to event dispatches, allowing for improvements in perception, orientation and actuation within a shared or device-specific multi-dimensional reality. In a particular embodiment of the invention, a discovery framework serves an initial networked device sharing context, whether digital or physical, with additional networked devices in order to calculate spatial transforms from one device-specific multi-dimensional reality to another. A spatial transform may define both translational and rotational changes between each device's multi-dimensional reality space. Translation may encapsulate movement in the lateral, longitudinal, or vertical axis. Rotation may encapsulate movement with regards to the roll, pitch and yaw of an initial networked device. The multi-dimensional nature of the manipulation also allows for time to be modified for synchronization among the networked devices.

For example, an initial device installed within an automobile and paired with a service seeking device (e.g. in step S230) may detect a bicycle lane using LIDAR devices placed on the rooftop of the car. This bicycle lane is detected in the reference frame of the LIDAR (meaning the LIDAR is at the origin). The bike lane may be displayed as a green colored line on the screen of a smartphone (secondary device) mounted on the dashboard of a vehicle (i.e. the phone camera is used to generate video, and the phone screen is used to display that video supplemented by bike lane demarcations as detected by the LIDAR). When displaying the bike lane overlay on the video feed of the networked device, the green line demarcating the bike lane would need to be placed in a reference frame where the smartphone camera is at the origin. Therefore, it would be beneficial to know the transformation (translation and rotation) from the LIDAR sensor to the camera sensor, so that a transformation can be applied to the mixed reality content consumed by the service seeking device.

In some embodiments, a discovery framework involves an initial networked device reporting its location, timestamp and an arbitrary payload that may include some combination of pictorial data, text data, audio data, video data, or other forms of metadata to a backend discovery service implemented by a discovery server (e.g. server 100). Additional networked devices also report their locations and timestamps to the backend discovery server. An algorithm implemented by server 100 may act to group spatial and temporal data streams together based on analyzing the movement of networked devices through temporal and spatial multi-dimensional realities along with the arbitrary payloads from networked devices. For example, in the scenario of the preceding paragraph with a LIDAR-detected bicycle lane overlaid on a smartphone camera video feed, the video feed might incur a delay (e.g. of about 1 second). In such circumstances, the optimal transformation may further include a temporal transformation component such as an added delay in the LIDAR feed to compensate, thereby helping make the displayed reality look consistent. In other circumstances, shared mixed reality content may be delayed relative to local mixed reality content; in such circumstances, it may be desirable to apply a delay to local mixed reality content in order to temporally align that content with the shared mixed reality content. In yet other circumstances, mixed reality content may be sourced from three or more sources (whether local or shared), and varying timing offsets may be applied by a device consuming the mixed reality content to each of the sources in order to align them temporally.

Figure 7:
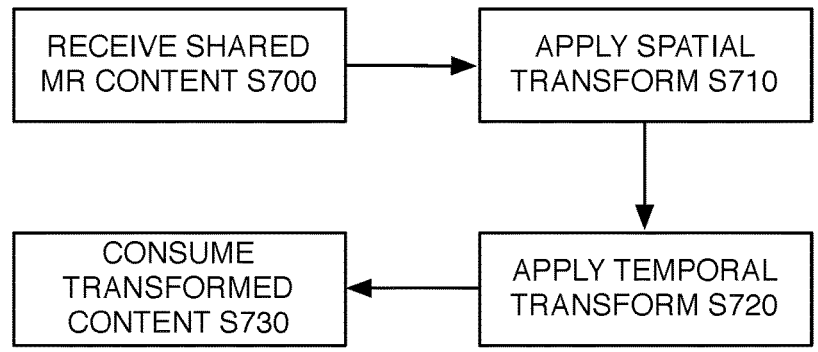
FIG. 7 is a process for transforming mixed reality content received by a service seeking device.

FIG. 7 illustrates an exemplary method for consumption of mixed reality content, in accordance with the principles described in detail in the preceding paragraphs, which may be applied in step S230 of the process of FIG. 2. In step S700, a service seeking device 120 receives mixed reality content shared with it by a service offering device 110. The mixed reality content received in step S700 includes content context. The content context may include, without limitation: descriptors of physical translation, descriptors of physical rotation, and timestamps or other temporal descriptors. In step S710, service seeking device 120 utilizes the shared mixed reality content physical translation and rotation descriptors, along with translation and rotation information descriptive of the service seeking device 120, to apply a spatial transform to the shared mixed reality content, thereby mapping the shared mixed reality content into a device-specific dimensional space applicable to service seeking device 120. In step S720, service seeking device 120 utilizes the shared mixed reality content temporal descriptors to apply a temporal transform to the shared mixed reality content and/or locally-sourced mixed reality content, thereby mapping the shared mixed reality content and locally-sourced mixed reality content into a consistent temporal space. In step S730, the shared mixed reality content, spatially and temporally transformed in steps S710 and S720, is consumed by the service seeking device 120.

As described above, backend server 100 may implement a component to introduce networked devices to each other based on the grouping of devices. Once the devices are grouped, and assuming a secondary device makes a request to discover available services in its vicinity, this component implements an algorithm to reduce the number of all available services for the secondary device down to only the ones which are relevant, or which can be consumed by the device. For example, if a secondary device does not have an audio output, there may be no need to introduce it to services offering audio mixed-realities. The output of the algorithm is a response to the device which made the request, informing it of the available services and potentially introducing this device to the initial (or service offering) devices providing these services. Networked devices may then establish a handshake to communicate directly between themselves.

Once service seeking and service sharing devices are paired (e.g. in step S230), mixed reality content may be shared via any of multiple communication mechanisms (e.g. communicated by mixed reality content generator 113 and other device communication interface 114, to service seeking device 120 and its communication interface 122 and mixed reality content consumption module 121, such as may occur in process step S700). In some embodiments, once a content sharing request is initiated, mixed reality content may be streamed from content sharing device 110 to content seeking device 120, with device 110 continuously sending data to device 120 without waiting for additional requests. In other embodiments, device communication modules (e.g. communication interfaces 114 and 122) may allow networked devices to subsequently communicate via proxy or utilizing remote procedure calls or long polling. A new device 120, seeking to join a shared mixed reality environment, may use a proxy server (or relay) (e.g. proxy server 130 shown in FIG. 1) which then receives data from the initial device 110 and forwards that data to the service seeking device 120. Proxy server 130 may act to distribute mixed reality content from a service offering device 110, to numerous service seeking devices 120, thereby potentially reducing the burden on service offering device 110 to coordinate and distribute to service seeking devices, amongst other benefits. With long polling, the service seeking device 120 may then start asking the service offering device 110 for service data, and in response to each request, the service offering device 110 transmits the service data. Different device-to-device communication mechanisms may be desirable for different applications and types of data.

In some embodiments, discovery server 100 may implement a pattern analysis module 105. Preferably, pattern analysis module 105 utilizes machine learning to recognize patterns in the data streams coming out of the multi-dimensional realities within various networked devices 110 and correlate those patterns to unique identifiers obtained from networked devices 110 (e.g. unique identifiers associated with a particular asset observed in the environment of a service offering device). A database implemented within data storage module 101 may store the patterns and the unique identifiers in a queryable format to be available later. An API service 106 may, amongst other things, integrate with third party services to communicate patterns in data streams upon request; thus, API 106 may serve to aggregate mixed reality content that is derived from mixed reality content data acquired by multiple service offering devices, potentially deployed on multiple vehicles, and make that aggregated mixed reality content available to external computing applications. In some use cases, such external computing applications served by API 106 could be implemented within a vehicle (e.g. an onboard semantic mapping module). In other use cases, such external computing applications served by API 106 could be implemented independently of any particular vehicle (e.g. a cloud-based semantic mapping service). In yet another use case, API 106 may operate to make a dashboard available for networked devices 110 to review and analyze information that is stored about them by server 100. A notification service (which may, in some embodiments, by implemented by API module 106) may then handle messaging between networked devices to dispatch events based on triggers.

In some embodiments, pattern analysis module 105 may further provide a mixed reality aggregation framework, implemented for the remote aggregation and collation of mixed reality content contributions from networked devices. The framework may be utilized to record observations from various devices and to compare observations with the purpose of generating and disseminating a more complete and consistent mixed reality understanding, at different dimensions (spatial, temporal, etc.). While pattern analysis module 105 is illustrated, in the embodiment of FIG. 3, as a component implemented by server 100, it is contemplated and understood that in other embodiments, pattern analysis module 105 (and a remote aggregation framework implemented thereby) may by implemented on a separate network-connected compute server, as a service that may be independent from device discovery, monitoring and matching. For example, in some embodiments, proxy server 130 may, in addition to or instead of serving as a conduit for communications between service offering and service seeking devices, implement a mixed reality aggregation service as described herein.

A mixed reality aggregation framework may utilize orthogonality of multiple observations from the networked devices to ensure independence of the observations. The framework may implement an algorithm, e.g. via discovery server 100, for the management of discrepancies between observations, by ranking different observations and devices based on trust. Trust may be determined based on the networked device metadata, indicating the type of sensor payload the device carries; e.g. the more accurate the sensor, the higher the level of trust. Other forms of building trust may include measuring the true positive rate of observations of a networked device over a period of time to determine if the particular device is trustworthy. Backend server 100 may also request further samples and observations from the devices to negotiate the mixed reality ground truth. For example, backend server 100 may proactively transmit requests for observations to selected devices, which may be desirable when the confidence level of a particular observation is too low, such as below a threshold level. Confidence may be measured by factors such as the trust in the observing device, and/or variance among prior observations. By leveraging an increased number of independent multi-dimensional observations, the observable reality can be reached with an exponentially diminishing false positive rate.

In some embodiments, devices 110 and 120 may include mixed reality content consumption systems. The consumption may take, inter alia, the following forms: auditory, tactile and visual feedback of the mixed reality content; methods for differentiating between dynamic, pseudo static and static information in the observable reality; methods for differentiating between virtual and physical realities; playback functionality of single observable reality using a temporal window; playback functionality of shared observable reality from multiple devices using a temporal window.

In an exemplary embodiment, mixed reality content consumption may refer to the visual display of map information on the camera feed of a vehicle traveling in an urban area. The feed may include the virtual overlay of street names on the actual road surface, particularly useful when the street name signs are obscured by vegetation ingress or other vehicles on the road. In another exemplary embodiment, the road surface may be free of the customary markings denoting lanes, and only the mixed reality experience provides the necessary markings denoting safe areas of travel for the vehicle. Such features may be used for alleviation of traffic congestion based of the time of the day.

A discovery framework may include a scheduler of tasks for the initial and additional networked devices, deployed on the backend server. In some embodiments, the scheduler may be implemented by, e.g., pattern analysis module 105; in other embodiments, the scheduler may be implemented by a separate component within server 100, or by an external network-connected server. The scheduler may access a queue of tasks to be completed by devices which possess the necessary features (e.g. devices that offer services satisfying desired criteria). The scheduler may dispatch the tasks to specific devices or groups thereof. This may be accomplished by means of deployment methods such as bootloading or over-the-air programming. Software applications, specific versions of the applications, or their configuration parameters may be transmitted from the server(s) implementing the discovery framework to the service offering devices. Various ways for validating the software versions may be utilized, such as binary signatures from md5sums.

A discovery framework may utilize a set of algorithms for the pairing of initial and additional networked devices with tasks. These algorithms may utilize specific metadata from each device, particular raw sensor data, features extracted from an observed reality, or the like. A ranking of the effectiveness of each device at a task may be generated. An optimization method may then be applied taking into account different devices, their characteristics and limitations (e.g. physical location and destination, available sensing and compute resources), to maximize mixed reality information coverage and accuracy. For example, a set of devices may be tasked with observing the state of a particular roadway intersection. Assuming only a subset of the devices carry a front-facing camera, while all the others have a rear-facing camera (or no camera at all), this feature of the backend could be used to dispatch the task only to those devices carrying the appropriate sensor payload (which information may be available in the device metadata, for example).

A discovery framework may also include a module, typically implemented within discovery service backend server 100, for collecting the results of the output of various scheduled tasks as they were performed by the initial and additional networked devices. In an exemplary embodiment, networked devices may report back map vector contributions observed as the devices travel on a roadway. The collection module may then assemble the contributions into a cache, and subsequently test various hypotheses on the correctness of the contributions. In one example of such an embodiment, a number of devices may be tasked with creating a virtual feature representing the centerline of a newly added lane on a highway. Each device may report its own version of this centerline, which inherit any positioning errors encountered at the device, or obstructions caused by a large truck blocking part of the lane. The backend may then collect these different observations as hypotheses, and then extract the virtual centerline using probability ratio tests, hidden markov models, or the like. A similar operation may also be performed on the networked devices themselves: a local copy of a map cache may be compared to the observed environment and validated or invalidated.

Networked devices may provide local processing capabilities for sensor data and sensor real time configuration. The initial networked device may have access to active sensing capabilities (LiDAR) or passive sensing capabilities (camera). In either case, the device may elect to dynamically configure sensors, such as by foveating the sensor optics, in order to generate higher amounts of information for each sensor frame. This foveation or other dynamic sensor configuration may be determined by a variety of factors, including observed realities, features extracted from the raw sensor streams, a request from the discovery backend, or the like. Similarly, the device may encapsulate or omit information from raw sensor data dynamically. This may be used to remove moving objects from the sensor data of the device and ensure only pseudo static and static information from the observable reality is retained. Such dynamic sensor configuration may be performed in response to a task assigned to a service offering device, in order to optimize data returned in response to the task. Additionally or alternatively, local data processing may be performed to extract observed information responsive to a task, thereby avoiding the return transmission of data that is unnecessary and/or irrelevant to a task. Thus, for example, a service offering device having received a task from server 100 to observe an object via LiDAR, may respond by configuring its LiDAR sensor to prioritize observations in the direction required for the task in order to increase observational capabilities associated with the task. The service offering device performing the task may then apply local data processing on LiDAR observations associated with the task, in order to extract observation data associated with the object being observed in response to the task, thereby maximizing the quality of task-relevant data while minimizing consumption of communication network bandwidth required for returning an observation in response to the task.

Figure 8:
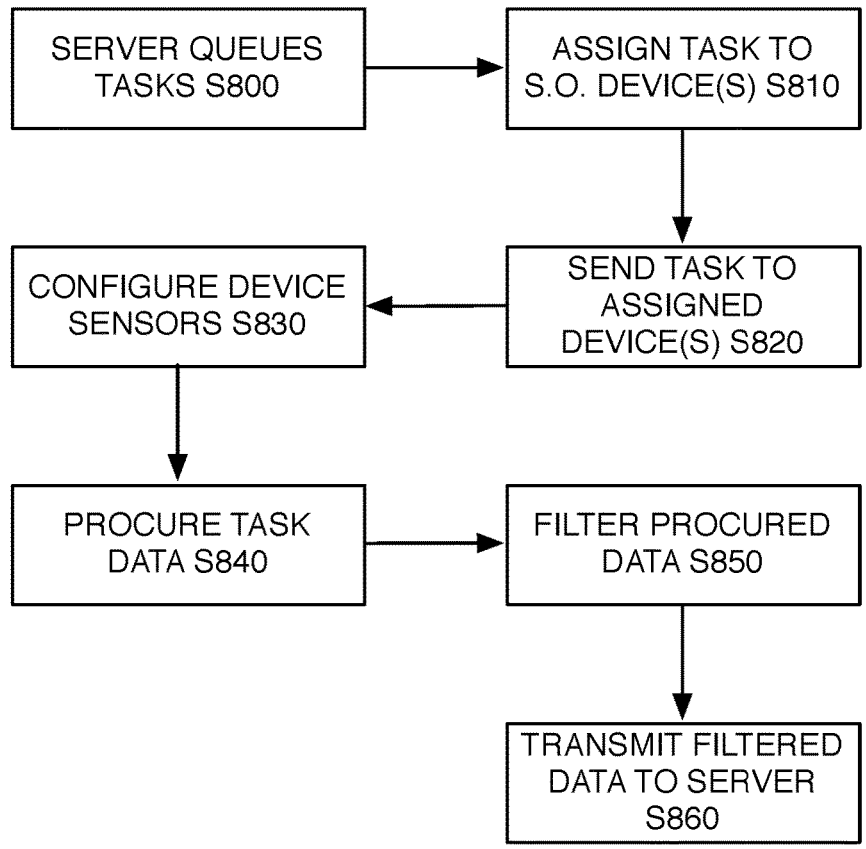
FIG. 8 is a process for utilizing distributed service offering devices to implement a centralized task queue for collection of mixed reality content.

FIG. 8 illustrates an exemplary process for managing a task queue across a distributed population of service offering devices, in accordance with an embodiment of certain systems and methods described above. In step S800, server 100 queues one or more tasks for allocation to service offering devices 110. In step S810, for each queued task, server 100 allocates the task to one or more service offering devices 110. In step S820, server 100 conveys each task to the services offering devices to which the task has been allocated. In step S830, a service offering device receiving a task dynamically configures sensory systems 112 in order to optimize the device's performance of the task. In step S840, the service offering device performs the task by procuring responsive data using sensory systems 112. In step S850, the service offering device filters data procured in step S840, to extract data associated with the task. In step S860, the service offering device transmits the extracted data back to server 100. Server 100 may thereby accomplish group collection of mixed reality content across a population of distributed service offering devices, while optimizing content quality and minimizing data transmission burden.

In some embodiments, networked devices may implement local data transformation and dimensionality reduction. In particular, networked devices may implement bidirectional registration of metadata and sensor data between a local sensor frame (defined by the device) and a global geo-referenced frame. The device may additionally or alternatively implement algorithms for the reduction of dimensionalities in the sensor stream to facilitate the extraction of features from the data. For example, the orientation of spatial point cloud data generated from a LiDAR sensor may be rotated into a frame of reference aligned with the ground plane observed by the device, thereby enabling standardized use of that data by devices with which the point cloud data is subsequently shared. Meanwhile, dimensionality reduction of that point cloud data may help reduce data volume and transmission bandwidth requirements. Different strategies for dimensionality reduction may be implemented, such as the compression of sensor data along one or more axes in a particular frame (e.g. along the direction of travel or the time axis). As such, the realities observed by the device may then be projected into the reduced dimensionality, stored and transmitted in that manner as well.

Networked devices may implement a position refinement algorithm, targeted at correcting and smoothing positioning errors relating to GPS and inertial sensor inaccuracies. In an exemplary embodiment, the initial device may utilize its sensor data to refine its position. This can be accomplished by extracting signatures from the sensor data and matching such signatures in a pre-existing localization map, assigning a geo-referenced position to various signatures. A particle filter may be utilized for generating a state estimation for the device, by combining the noisy inertial and positioning measurements with the corrections provided from the search functionality in the localization signature table. The localization methods may be applied for loop closures in the data, preventing the effects of drift on the registered sensor data.

It may also be desirable to provide a protocol for network communication between initial networked devices and additional networked devices wherein devices may share their current and previous state machines or their future intentions. For example, in some embodiments, an initial device may track the position of a vehicle as it moves on a road infrastructure. In the case of an automated vehicle, the initial device may be aware of the source and destination of the vehicle, along with the turn-by-turn and lane-by-lane intentions of the vehicle. A tablet computer may be provided within the vehicle, acting as a secondary, service seeking device receiving vehicle position data from another in-vehicle service offering device, whereby the tablet computer can then display the precise position of the vehicle within a 3D map. This feature would allow the initial (service offering) device to send the future intentions of the vehicle and display those on the secondary (service seeking) device. Concerning a vehicle occupant watching the secondary device (tablet computer) display, this feature would increase the occupant's trust in the automated vehicle, to the extent the occupant would know where the vehicle intends to go, such that the vehicle's operations are less likely to be unexpected to the occupant. Protocols described elsewhere herein may be utilized to implement such functionality.

Initial networked devices or additional networked devices may utilize a wide variety of content, including media content, static content, non-static content and projectable content. Media content may include pictorial data, multimedia data, audio data, textual data, geospatial data, ASCII metadata, binary metadata, executable programs, configurations, machine learning features and models, state machines from the device, debugging information or any other arbitrary payload. The media content may be manipulated by parameters that take into account the orientation of an initial networked device physically, the observable reality of an initial networked device, the state-machine of an initial networked device, the intentions of an initial networked device whilst operating autonomously or with external assistance, the location of an initial networked device, the temporal/spatial information describing an initial networked device's movement over time in a multi-dimensional reality or any unique identifiers contained within or generated by an initial networked device.

Static content that may be shared between devices includes, but is not limited to: usage of images, videos, web pages, JavaScript code, cascading style sheets, configuration files in JSON, configuration files in XML, GeoJSON files in JSON, Shapefiles or other information represented as arbitrary payloads. Non-static content which may be utilized by networked devices includes, but is not limited to, RESTFUL APIs, asynchronous event driven data streams, database query & responses, miscellaneous micro-services, in-memory caches, callbacks, interprocess communication (IPC) or serial interfaces.

Projectable content may include, but is not limited to, map vector information representing observable physical objects, map vector information representing virtual objects being projected, map annotations representing the physical and virtual features contained within the map. The content may be merged with a corresponding video feed, or directly with the user's view through a head-mounted display, to present a mixed reality perspective of the map information.

Devices may utilize temporal metadata for actuating events which may include, but are not limited to, the usage of UTC timestamps, GPS time, relative time since a particular event, asynchronous event driven messaging triggered by a discrete event simulator or other forms of generic notifications with arbitrary payloads.

Networked devices may use geo-fences to define the spatial boundaries in various coordinate systems which may include, but are not limited to, the usage of boundaries in a sensor reference frame, boundaries in an ellipsoidal coordinate system, boundaries in a Cartesian coordinate system or boundaries in a spherical coordinate system. Geo-fences may be used for delimiting areas in which the mixed reality content is available, or where more content is available for sharing.

Event triggers may be used to, e.g., initiate a particular version of the mixed reality content or alter the present content. Examples of event triggers include, but are not limited to: accelerometer event triggers where strong acceleration signals are recorded in one or many dimensions; GPS event triggers where a particular state of the received signals determines the mixed reality content transmitted or consumed; vision event triggers where the raw vision sensor inputs or the presence of any features extracted from the sensor data may trigger a variation in the mixed reality experience; hypothesis testing event triggers where changes in the expected mixed reality and the present one may be reported to one or more devices and uploaded to the discovery services backend.

A mobile platform carrying one or more networked devices may utilize a platform configuration file to describe where the sensors and devices are mounted on the platform. For example, a vehicle may include a sensor frame mounting multiple sensors of one or more different types (e.g. LiDAR, optical camera, radar), positioned in various orientations (e.g. forward facing, rear facing, angled laterally, and having different positions with respect to the vehicle). In some embodiments, the configuration may choose to describe the relative positional offsets in x,y,z from the origin of the rigid body platform frame. In addition to the positional offsets, rotational angles may also be described representing the rotation from the origin of the rigid body platform frame. The platform configuration file may be transmitted by one or more associated service offering devices, and utilized by other devices receiving content, or by the discovery services backend, in order to interpret received data, such as described above in connection with an embodiment of a smartphone translating LIDAR-detected bicycle lane demarcations onto camera video taken from a different position and orientation.

A mobile platform carrying initial networked devices or additional networked devices may utilize a wide array of hardware that has different characteristics. The description of the characteristics may also be provided in a hardware configuration file. The hardware configuration may choose to describe the resolution, the field of view, the sampling rate, the accuracy, the range, the computation capacity, the tolerances, the size, the environmental ruggedness, the data rates or various other characteristics that are applicable to the hardware. The hardware configuration file may work in tandem with the platform configuration file to describe how the hardware is mounted and utilized by the platform. Such hardware characteristic data may be utilized for any of multiple purposes, including, without limitation: interpreting mixed reality content; transforming mixed reality content into different dimensional spaces; grouping of service offering devices; assessing quality of mixed reality content; and evaluating trust to be accorded to mixed reality content.

Figure 9:
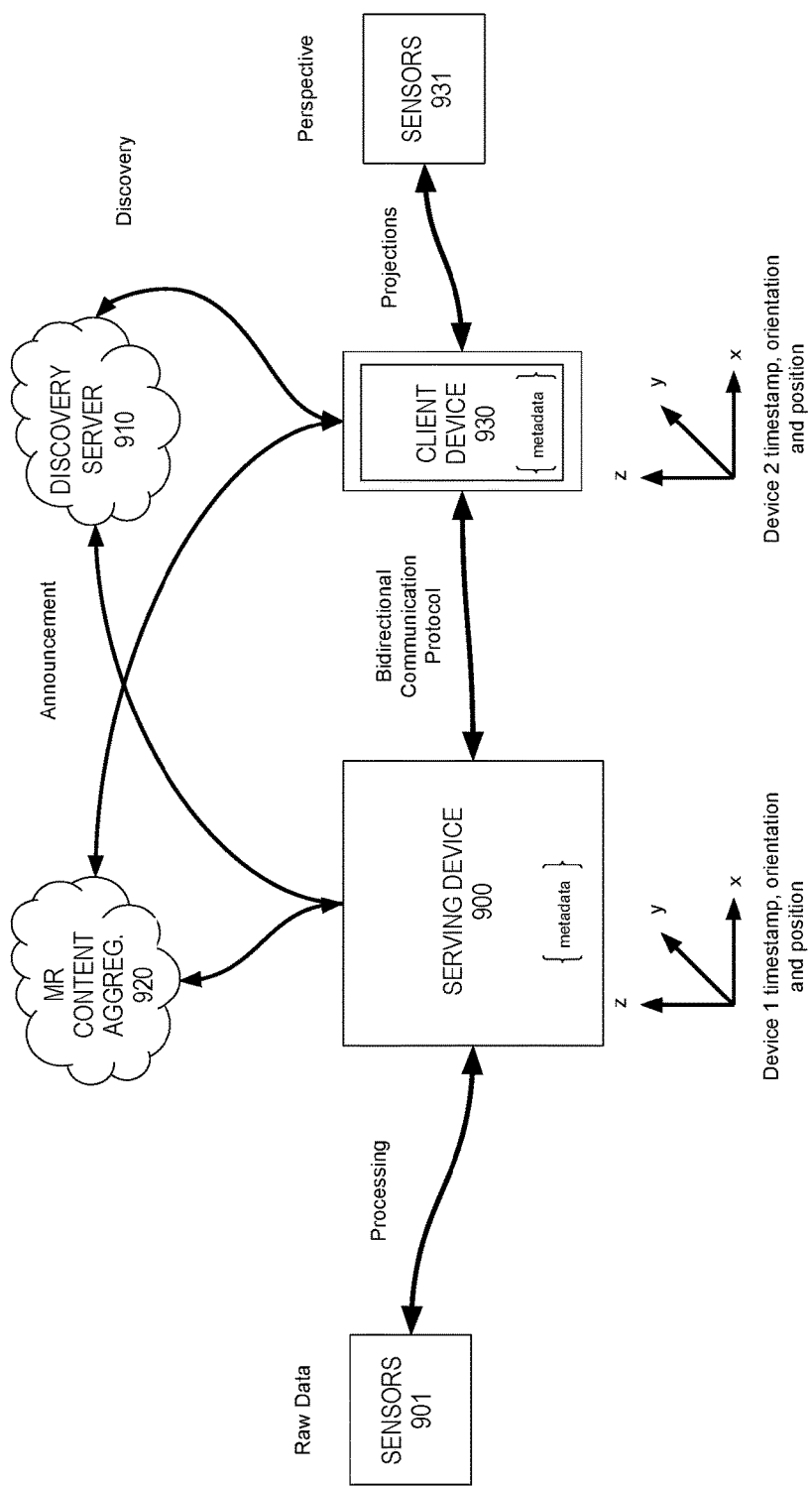
FIG. 9 is a schematic block diagram of an arrangement for discovering and sharing mixed reality content.

FIG. 9 illustrates a further embodiment, implementing a further combination of features and capabilities described herein. In the embodiment of FIG. 9, serving device 900 acts as a mixed reality content offering device. Serving device 900 receives raw data from sensors 901, which data may be processed to generate operational mixed reality content. Mixed reality content generated by serving device 900 includes spatial and temporal metadata, including a timestamp, orientation descriptors and position descriptors. Serving device 900 communicates via a digital communications network, such as the Internet, with discovery server 910 in order to coordinate pairing with other devices. Serving device 900 also communicates with mixed reality content aggregation server 920. Server 920 may thereby obtain, store, process and/or redistribute mixed reality content provided by serving device 900 (as well as other content offering devices) and informational data derived therefrom.

Client device 930 may interact with discovery server 910 in order to identify sources of mixed reality content. Client device 930 may also be associated with spatial and/or temporal metadata (such as timestamp, orientation and position), which metadata may be utilized by discovery server 910 (alone or preferably in combination with metadata from mixed reality content serving devices such as serving device 900) in order for discovery server 910 to pair client device 930 with one or more sources of content, such as serving device 900. Once paired with serving device 900, client device 930 and serving device 900 may communicate directly, in order for serving device 900 to provide mixed reality content to client device 930. In some use cases, client device 930 may additionally or alternatively seek to obtain mixed reality content from mixed reality content aggregator 920, whether through an analogous discovery and pairing process orchestrated by discovery server 910, or via direct query between client device 930 and aggregator 920. In any event, client device 930 may then consume any such sources of mixed reality content. Client device sensors 931 may also be utilized to provide further inputs for mixed reality consumption, including, without limitation, camera and microphone inputs for integrating locally-obtained content with shared mixed reality content, as well as orientation sensors for applying appropriate spatial transformations to mixed reality content obtained from other sources.

Figure 10:
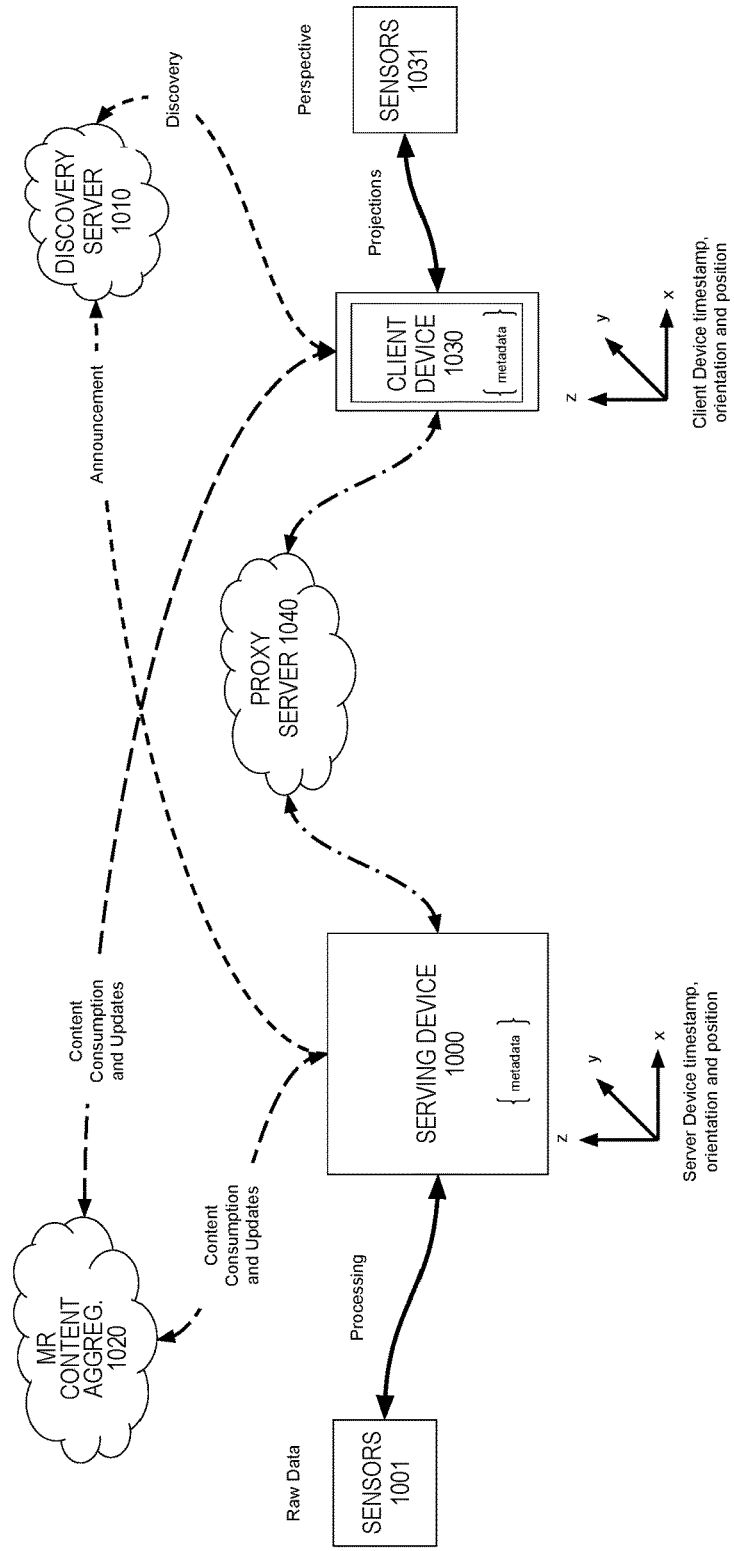
FIG. 10 is a schematic block diagram of a further arrangement for discovering and sharing mixed reality content.

FIG. 10 illustrates yet another embodiment, analogous to that of FIG. 9, but further providing a proxy server to facilitate transfer of mixed reality content between serving and client devices. Specifically, client device 1030 may discovery serving device 1000 via interactions with discovery server 1010. However, once paired, rather than serving device 1000 and client device 1030 exchanging mixed reality content directly, serving device 1000 provides mixed reality content to proxy server 1040. Proxy server 1040 may then make that content available to client device 1030. Mixed reality content may be acquired by, or derived from data provided by, serving device sensors 1001, and associated with temporal and spatial metadata, such as timestamp, orientation and position. Likewise, client device 1030 may utilize sensors 1031 in connection with its consumption of mixed reality content obtained remotely via proxy server 1040 or from mixed reality content aggregator 1020, or obtained from other sources.

Networked devices may utilize various communication channels to pass various messages to each other. Techniques for broadcasting messages or notifications may include, but are not limited to: the usage of remote procedure calls with name spacing in the cloud, namespaces that relay messages to subscribed clients, and send all messages that blast a global message to all connected clients. Communication channels may leverage encryption or compression techniques to reduce data sizes and secure the communication channel from sniffing.

Initial networked devices or additional network devices may utilize the concept of rooms to enable clients to subscribe to a namespace. In a client server architecture, clients may subscribe to a room and send messages using various protocols that may include, but are not limited to, the usage of RESTFUL API services, socket communication, web sockets, remote procedure calls, TCP sockets, UDP sockets, RTSP or other forms of protocols that can relay messages from one client in a room to one or many clients in a room. The rooms may include functionality to retrieve information about which clients are currently subscribed, the usage of direct messages or private messages between clients. Interfaces to the rooms may include but is not limited to the usage of web browsers, native desktop user interfaces, terminal command line in containers (e.g. Docker containers or Linux containers), terminal command line in the host operating system, headless programmatic access via RESTFUL API services, socket communication, web sockets, remote procedure calls, TCP sockets, UDP sockets, RTSP or other forms of protocols.

Initial networked devices or additional network devices or a centralized backend infrastructure may choose to broadcast messages using various communication channels which may include, but are not limited to, the usage of RESTFUL API services, socket communication, web sockets, remote procedure calls, TCP sockets, UDP sockets, RTSP or other forms of protocols. Initial networked devices or additional networked devices may discover each other based on the pairing information stored in the backend infrastructure, initial networked devices or additional networked devices. A configuration may be provided to initial networked devices or additional networked devices or backend infrastructure to enable peer to peer broadcasting or a proxy-based broadcasting of messages and notifications.

Initial networked devices or additional networked devices or a centralized service may use, but are not limited to, metadata such as public IPs, private IPs, MAC addresses, port addresses, short codes or an arbitrary payload to enabled devices to discover each other and interact either through direct node-to-node communication or remote procedure calls using a common backend.

Initial networked devices or additional networked devices or a centralized service may project metadata between different frames. Some examples of frames may include, but are not limited to, the usage of geo-reference frames, the platform reference frame, the local sensor reference frames of camera data, the local sensor reference frames of LiDAR data, the local sensor reference frames of radar data, any local sensor reference frame of arbitrary data streams. Filters may be used to introduce or reverse transforms to calibrate projections while they are moving between reference frames which may include, but are not limited to, the usage of distortion filters, image stabilization, stochastic sampling or other filters to calibrate to the reference frames.

Initial networked devices or additional networked devices or a centralized service may utilize techniques to project mixed reality content, such as 3D reconstruction techniques, 2D registration techniques, and integration of arbitrary messages from peripheral devices that are sharing the same reference frame as the mobile platform.

While certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of the invention or appended claims.

The invention claimed is:

1. A method for a network-connected server to facilitate sharing of mixed reality services amongst a plurality of vehicles, each vehicle containing one or more mixed reality service offering devices and/or one or more mixed reality service seeking devices communicating via a common digital communications network, the method comprising:
   receiving via the digital communications network, from each of one or more service offering devices, one or more announcements comprising identification of services provided by the service offering device and a location associated with the service offering device;
   receiving via the digital communications network, from a service seeking device, a request for services;
   publishing, to the service seeking device, identification of one or more service offering devices and services provided thereby, wherein the service seeking device may pair with, and receive mixed reality services from, one or more of the service offering devices;
   maintaining a queue of tasks to be completed by service offering devices; and for each task in the queue of tasks: (a) identifying one or more qualified service offering devices satisfying task-specific criteria; and (b) dispatching the task to the qualified service offering devices via the digital communications network;

collecting, by the server, responses to a task from a plurality of qualified service offering devices; and aggregating the responses to develop a shared model responsive to the task.

2. The method of claim 1, in which the task comprises observing a roadway lane centerline; and the shared model comprises a model of the roadway lane centerline formed based on a plurality of task responses received by the server.

3. The A method for a network-connected server to facilitate sharing of mixed reality services amongst a plurality of vehicles, each vehicle containing one or more mixed reality service offering devices and/or one or more mixed reality service seeking devices communicating via a common digital communications network, the method comprising:

receiving via the digital communications network, from each of one or more service offering devices, one or more announcements comprising identification of services provided by the service offering device and a location associated with the service offering device;

receiving via the digital communications network, from a service seeking device, a request for services; and publishing, to the service seeking device, identification of one or more service offering devices and services provided thereby, wherein the service seeking device may pair with, and receive mixed reality services from, one or more of the service offering devices;

pairing the service seeking device and a service offering device for direct communications there between;

sharing mixed reality content from a first one of said service offering devices, to the service seeking device; and applying a spatial transform to the shared mixed reality content prior to use of the shared mixed reality content by the service seeking device, in which the step of applying a spatial transform to the shared mixed reality content comprises compensating for changes in translation and/or rotation between the service offering device and the service seeking device.

4. The method of claim 3, further comprising applying a temporal transform to the shared mixed reality content prior to use of the shared mixed reality content by the service seeking device, in order to map the shared mixed reality content and the locally-sourced mixed reality content into a common temporal space.

5. A method for a network-connected server to facilitate sharing of mixed reality services amongst a plurality of vehicles, each vehicle containing one or more mixed reality service offering devices and/or one or more mixed reality service seeking devices communicating via a common digital communications network, the method comprising:

receiving via the digital communications network, from each of one or more service offering devices, one or more announcements comprising identification of services provided by the service offering device and a location associated with the service offering device;

receiving via the digital communications network, from a service seeking device, a request for services;

publishing, to the service seeking device, identification of one or more service offering devices and services provided thereby, wherein the service seeking device may pair with, and receive mixed reality services from, one or more of the service offering devices;

transmitting mixed reality content from one or more of said service offering devices, to a mixed reality aggregation server; and generating, by the mixed reality aggregation server, aggregate mixed reality content derived from the mixed reality content received from the one or more of said service offering devices, in which the step of generating aggregate mixed reality content comprises: weighting, by the mixed reality aggregation server, mixed reality content contributions from each service offering device based at least in part on a level of trust associated with the service offering device, in which the level of trust associated with the service offering device is based at least in part upon a sensor capability level associated with the service offering device.

6. A method for a network-connected server to facilitate sharing of mixed reality services amongst a plurality of vehicles, each vehicle containing one or more mixed reality service offering devices and/or one or more mixed reality service seeking devices communicating via a common digital communications network, the method comprising:

receiving via the digital communications network, from each of one or more service offering devices, one or more announcements comprising identification of services provided by the service offering device and a location associated with the service offering device;

receiving via the digital communications network, from a service seeking device, a request for services; and publishing, to the service seeking device, identification of one or more service offering devices and services provided thereby, wherein the service seeking device may pair with, and receive mixed reality services from, one or more of the service offering devices;

transmitting mixed reality content from one or more of said service offering devices, to a mixed reality aggregation server;

generating, by the mixed reality aggregation server, aggregate mixed reality content derived from the mixed reality content received from the one or more of said service offering devices;

determining, by the mixed reality aggregation server, that an aggregate confidence level in a prior observation falls below a threshold value;

identifying a select service offering device having sensory systems capable of replicating the prior observation;

transmitting, from the server to the select service offering device, a request to replicate the prior observation;

receiving, from the select service offering device, a measurement of the prior observation; and updating the prior observation based at least in part on the measurement from select service offering device.

* * * * *